United States Patent [19]

Moirano

[11] 4,307,124

[45] Dec. 22, 1981

[54] COMPOSITION AND METHOD FOR PREPARING DESSERT GEL

[75] Inventor: Arthur L. Moirano, Mountainside, N.J.

[73] Assignee: FMC Corporation, Philadelphia, Pa.

[21] Appl. No.: 130,664

[22] Filed: Mar. 17, 1980

[51] Int. Cl.³ .............................................. A23L 1/04
[52] U.S. Cl. .................................. 426/573; 426/271; 426/575
[58] Field of Search .................... 426/575, 573, 271

[56] References Cited

U.S. PATENT DOCUMENTS

| | | | |
|---|---|---|---|
| 2,864,706 | 12/1958 | Stoloff | 426/575 |
| 3,342,612 | 9/1967 | Foster et al. | 426/575 |
| 3,367,783 | 2/1968 | Billerbeck | 426/575 |
| 3,445,243 | 5/1969 | Moirano | 426/575 |
| 3,502,483 | 3/1970 | Glicksman et al. | 426/575 |
| 3,556,810 | 1/1971 | Moirano | 426/575 |
| 3,956,173 | 5/1976 | Towle | 426/575 |
| 3,962,482 | 6/1976 | Comer et al. | 426/575 |
| 4,096,327 | 6/1978 | Guiseley | 426/575 |

*Primary Examiner*—Jeanette M. Hunter
*Attorney, Agent, or Firm*—Eugene G. Horsky; Charles H. Johnson

[57] ABSTRACT

A method and a kappa carrageenan food composition that is swellable in cold water and gels at room temperature into a structure which is releasable from a mold and provides within the mouth of a consumer a desirable pulpy mouth feel.

6 Claims, No Drawings

COMPOSITION AND METHOD FOR PREPARING DESSERT GEL

This invention relates to a carrageenan food composition that is swellable in cold water and gels at room temperature to provide a uniform and well developed gel which is unmoldable and exhibits a desirable mouth feel.

Well known in the art is that carrageenan extract from *Chondrus crispus* forms a gell in a water solution; that this carrageenan contains two carrageenan components, kappa and lambda carrageenans; and that only the kappa carrageenan exhibits gel-forming characteristics in a water solution. Also recognized is that the strength of the water gel that is formed is greatly affected by the cations which are present, for example, with the presence of sodium cations imparting little gel strength, while the gel-forming properties of the kappa carrageenan are greatly enhanced in the presence of potassium cations. Thus, kappa carrageenan is often referred to in the art as "potassium-sensitive carragenan."

While the kappa carrageenan and the lambda carrageenan can be separated, it is not necessary to do so and in the practice of the invention which ordinarily is employed is a carrageenan that contains a substantial proportion of kappa carrageenan. Carrageenan recovered from *Chondrus crispus* is of this type and can be derived from sea plants other than *Chondrus crispus*, such as, *Gigartina stellata*, *Eucheuma striatum* and *Eucheuma cottonii*.

Potassium-sensitive carrageenan, especially one that contains both calcium and potassium cations in sufficient quantity, is insoluble in cold water; that is, water which is at room temperature. Upon removal of the calcium cations, as for example, by a sequestrant, the carrageenan exhibits a high degree of swelling in cold water, particularly if the potassium cation content in the carrageenan is less than about 5%. However, the swollen mass which results is not unmoldable; that is, does not release from a mold, and is of poor eating quality as it offers no resistance on chewing.

Disclosed in U.S. Pat. No. 3,502,483 is a cold water soluble gel producing mixture prepared by converting extracts of Eucheuma seaweed to a water-soluble form by means of ion exchange. As the extract of Eucheuma seaweed is substantially in the form of the calcium salt, and thus not soluble in cold water, it is simply dissolved in hot water and contacted with an ion exchange resin for such time as to convert substantially all of the calcium salts to a sodium, potassium, or ammonium salt. The resulting Eucheuma salt is soluble in cold water but the dissolved mix requires refrigeration at 45° F. for gel formation.

Described also in U.S. Pat. No. 3,502,483 is quick-setting gel formed by causing calcium or potassium ions to react with sodium eucheuman. When a slightly soluble calcium salt, such as calcium sulfate, is used in the formulation, an acid, such as adipic acid, must be used to control the rate of release of the calcium ions into solution as the calcium will not go into solution if the pH is too high and will dissolve too rapidly if the pH is too low. On the other hand, when a potassium salt or a soluble calcium salt is used, the gelation reaction is so rapid that if all of the ingredients are added to water together a very uneven gel results. Thus, to avoid this difficulty, the potassium or soluble calcium salt are packaged separately from the sodium eucheuman.

In U.S. Pat. No. 3,956,173, mention is made that kappa carrageenan becomes readily soluble in cold water when it is converted to the sodium salt form and, also, that its solubility is considerably reduced by the presence of potassium salts. It is recognized that in forming gels of the sodium salt the carrageenan must be dissolved completely before the potassium salt is introduced. Yet, inducing gel formation by addition of the potassium salt to a solution of sodium kappa carrageenan in a separate step is not satisfactory as this invariably leads to localized gel formation and a broken gel texture.

In accordance with the teachings of U.S. Pat. No. 3,956,173, these difficulties are overcome by encapsulating the potassium salt, such as potassium chloride and preferably potassium phosphate, or potassium citrate, with a water-soluble hydroxypropyl cellulose and dry blending the same with the sodium kappa carrageenan prior to adding to water to effect gelling. While this procedure may well provide for a desired result, it also has disadvantages in that conversion of the kappa carrageenan to the sodium form, and encapsulation of the potassium salt are required. Moreover, the encapsulation is rather demanding since high add-on coatings of the water-soluble hydropropyl cellulose can retard the dissolution excessively and increase the time to achieve full gel strength, while low add-on coatings of such polymer will not give sufficient retardation time so that uniform gel formation is not achieved. A still further disadvantage is that deionized water must be employed for gel preparation.

Accordingly, a primary object of this invention is the provision of a method and a carrageenan composition that is swellable in ordinary cold tap water and gels at room temperature to provide a uniform and well developed gel which is unmoldable and exhibits a pleasing pulpy texture within the mouth of the consumer.

Stated briefly, this invention comprises an improved gel forming composition consisting of kappa carrageenan having less than about 5% by weight of each of potassium and calcium cations, a sodium salt of a sequestering agent, potassium bitartrate, and cold soluble locust bean gum. The sequestering agent is present in an amount sufficient to sequester substantially all of the polyvalent cations present when the composition is dissolved in cold tap water and thereby enable the carrageenan to assume a highly swollen state. The potassium bitartrate provides for the development of the carrageenan gel structure at room temperature as the potassium bitartrate dissolves slowly and thus releases the potassium cations at a controlled rate. Locust bean gum is not gel-forming but its presence in the composition further enhances the set so that the resulting gel structure is unmoldable and has good eating qualities.

In use, the dry composition of this invention is simply mixed with water, as by shaking, and allowed to set. As indicated, ordinary cold tap water; that is, tap water at room temperature, is satisfactory. Gelling occurs at room temperature but refrigeration may be utilized, particularly if a firmer set is desired.

Sugar also is normally included in the composition for dispersion of the ingredients and for sweetness, and one or more organic acids, such as adipic, fumaric, and citric acids, or salts thereof are added to impart tartness. The gel structure obtained is pulpy in nature, and thus somewhat chewable, and may serve as a basis for the preparation of various flavored instant desserts, such as bland neutral pH products or fruit flavored low pH products.

In the described carrageenan composition, the sequestering agent renders inactive substantially all of the polyvalent cations which are present during gel formation. As carrageenans are normally extracted from sea plants in the presence of lime, it is not uncommon for conventional kappa carrageenan to contain from 3 to 4% of calcium cations, based upon the weight of carrageenan. When such carrageenan is used, for example, at 1% concentration in water, the concentration of calcium cations in the aqueous solution will range from 300 to 400 ppm. Moreover, as the carrageenan composition of this invention is intended to be placed in solution with ordinary tap water, both calcium and magnesium cations are likely to be present during gel preparation. Of course the hardness of the water used will vary with location, and a very hard water can well introduce perhaps some 200 ppm of calcium cations. Accordingly, to satisfy its intended function, the sequestering agent is present in amounts ranging from about 0.2 to 0.75 gram per cup (235 mL) of water employed.

A variety of non-toxic sequestering agents, used alone or in combination, are useful in the composition of this invention. For fruit flavored preparations which require a low pH, as for example, peach, pear, etc., polyphosphates, such as, sodium hexametaphosphate, are most effective. For neutral pH products, sodium salts of orthophosphates, carbonates, as well as polyphosphates, are satisfactory.

As the kappa carrageenan goes into a highly swollen state upon removal of the polyvalent cations by the sequestering agent, the potassium cations provide for gel development, which occurs uniformly as a result of controlled release of the potassium cations by the slowly dissolving potassium bitartrate. Preferably, the potassium bitartrate is present in such amount as to provide from 0.2 to 0.75 gram thereof per cup (235 mL) of water used for solution.

Food grade potassium salts, other than potassium bitartrate, are unsatisfactory for use in the composition of this invention as they dissolve much too rapidly, going into solution before the carrageenan has an opportunity to swell. With such flat dissolving potassium salts, the potassium cations actually retard or totally inhibit the carrageenan to swell.

The synergistic effect of locust bean gum with kappa carrageenan is well known but has heretofore been used only in applications where the locust gum and carrageenan have been solubilized by heat. This same synergism is achieved with the cold soluble locust bean gum included in the composition of this invention in that the set of the gel is enhanced and the resulting gel structure is unmoldable and has good eating qualities. The cold soluble locust bean gum provides for clear and smooth gels and is present in greater amounts as the amount of kappa carrageenan used in the composition is reduced. Preferably, the kappa carrageenan is present in such amount as to provide for about 0.5–2.5 grams per cup of water used for solution, while the cold soluble locust bean gum is present in amounts as to provide from 2.0 to 0.5 grams thereof. Cold soluble locust bean gum suitable for use in the composition of this invention is available commercially from the Marine Colloids Division of FMC Corporation, Rockland, Maine.

To further illustrate the merits of the present invention, reference is made to the following Examples.

EXAMPLE 1

1.5 grams kappa carrageenan
1.0 grams cold soluble locust bean gum
0.5 grams sodium hexametaphosphate
0.3 grams potassium bitartrate
1.0 grams adipic acid
35.0 grams sugar
   color and flavor to suit A blend of the above was added to 1 cup (235 mL) of tap water at room temperature in a shaker and the whole shaken vigorously for 30 seconds. The heavy gelatinous mixture was poured into molds and allowed to set at room temperature for 15 minutes, after which time it could readily be unmolded. Refrigeration produced a much firmer set.

EXAMPLE 2

0.5 grams kappa carrageenan
2.0 grams cold soluble locust bean gum
0.3 grams sodium hexametaphosphate
0.2 grams potassium bitartrate
1.0 adipic acid
35.0 grams sugar
   color and flavor to suit The procedure was followed as set forth in Example 1 with essentially like satisfactory results being achieved.

EXAMPLE 3

2.5 grams kappa carrageenan
0.5 grams cold soluble locust bean gum
0.5 grams sodium hexametaphosphate
0.3 grams potassium bitartrate
1.0 grams adipic acid
35.0 grams sugar
   color and flavor to suit The procedure was followed as set forth in Example 1 with essentialy like satisfactory results being achieved.

I claim:

1. A dry cold water-soluble, room temperature gelling food composition comprising kappa carrageenan containing less than about 5% by weight of the carrageenan of each potassium and calcium cations, a sodium salt of a sequestering agent, potassium bitartrate, and cold soluble locust bean gum, the sequestering agent, potassium bitartrate, and locust bean gum being present in amounts sufficient to, respectively, sequester substantially all of the polyvalent cations present when the composition is dissolved in cold water and permit the carrageenan to assume a highly swollen state, to develop a carrageenan gel structure at room temperature as potassium cations are released at a controlled rate by the slowly dissolving potassium bitartrate, and to so enhance the set of the gel structure as to render the same unmoldable and to impart thereto a desirable pulpy mouth feel.

2. The composition of claim 1 in which the sequestering agent is a sodium salt soluble in water and selected from the group consisting of polyphosphates, orthophosphates and carbonates.

3. The composition of claim 1 further including sugar for dispersion and sweetness and an edible acid for tartness.

4. The method of preparing an edible carrageenan gel structure which is unmoldable and exhibits a desirable pulpy mouth feel, which comprises vigorously mixing in water at room temperature a composition containing kappa carrageenan, a sodium salt of a sequestering agent for sequestering substantially all of the polyvalent cations in the carrageenan and water and permit the carrageenan to swell, potassium bitartrate providing by its slow dissolution potassium cations to develop the swollen carrageenan into a gel structure, and cold soluble locust bean gum for enhancing gel set, and thereafter allowing the mixture to set at room temperature.

5. The method as defined in claim 4 wherein per cup of water used in the mixture the constituents of the composition are present in amounts as to provide from about 0.5–2.5 grams of kappa carrageenan, 0.2–0.75 gram sequestering agent, 0.2–0.5 gram potassium bitartrate, and 2.0–0.5 grams cold soluble locust bean gum.

6. The method as defined in claim 5 wherein the water is tap water and the vigorous mixing is achieved by shaking the water and composition.

* * * * *

UNITED STATES PATENT AND TRADEMARK OFFICE
CERTIFICATE OF CORRECTION

PATENT NO. : 4,307,124
DATED : December 22, 1981
INVENTOR(S) : Arthur L. Moirano It is certified that error appears in the above—identified patent and that said Letters Patent is hereby corrected as shown below:

Column 1, line 8, insert --pulpy-- between "desirable" and "mouth"; line 11, "gell" should read --gel--. Column 3, line 12, insert --a-- before "1%"; line 45, "flat" should read --fast--; line 50, insert --bean-- between "locust" and "gum". Column 4, line 66, "vigoruously" should read --vigorously--.

Signed and Sealed this

Sixth Day of April 1982

[SEAL]

*Attest:*

*Attesting Officer*

GERALD J. MOSSINGHOFF

*Commissioner of Patents and Trademarks*